US011891584B2

(12) United States Patent
Brüse

(10) Patent No.: US 11,891,584 B2
(45) Date of Patent: Feb. 6, 2024

(54) OILS WITHOUT UNWANTED CONTAMINANTS

(71) Applicant: CARGILL, INCORPORATED, Wayzata, MN (US)

(72) Inventor: Falk Brüse, Wayzata, MN (US)

(73) Assignee: Cargill, Incorporated, Wayzata, MN (US)

( * ) Notice: Subject to any disclaimer, the term of this patent is extended or adjusted under 35 U.S.C. 154(b) by 648 days.

(21) Appl. No.: 16/609,803

(22) PCT Filed: May 23, 2018

(86) PCT No.: PCT/US2018/034072
§ 371 (c)(1),
(2) Date: Oct. 31, 2019

(87) PCT Pub. No.: WO2018/217856
PCT Pub. Date: Nov. 29, 2018

(65) Prior Publication Data
US 2020/0056116 A1 Feb. 20, 2020

(30) Foreign Application Priority Data
May 24, 2017 (EP) .................................... 17172752

(51) Int. Cl.
| | |
|---|---|
| *C11B 3/00* | (2006.01) |
| *B01D 1/08* | (2006.01) |
| *C11B 3/04* | (2006.01) |
| *C11B 3/12* | (2006.01) |
| *C11B 3/14* | (2006.01) |
| *C11B 3/10* | (2006.01) |
| *A23L 5/20* | (2016.01) |
| *A23L 5/49* | (2016.01) |
| *A23L 33/00* | (2016.01) |
| *A23D 9/04* | (2006.01) |

(52) U.S. Cl.
CPC ............... *C11B 3/001* (2013.01); *B01D 1/08* (2013.01); *C11B 3/04* (2013.01); *C11B 3/10* (2013.01); *C11B 3/12* (2013.01); *C11B 3/14* (2013.01); *A23D 9/04* (2013.01); *A23L 5/20* (2016.08); *A23L 5/276* (2016.08); *A23L 5/49* (2016.08); *A23L 33/40* (2016.08)

(58) Field of Classification Search
CPC ..... C11B 3/04; C11B 3/10; C11B 3/12; C11B 3/14; C11B 3/001; B01D 1/08
See application file for complete search history.

(56) References Cited

U.S. PATENT DOCUMENTS

| | | | | |
|---|---|---|---|---|
| 3,362,794 A | * | 1/1968 | Bergman ................... | C11B 3/06 422/429 |
| 4,089,880 A | * | 5/1978 | Sullivan ................... | C11B 3/001 554/205 |
| 4,325,883 A | * | 4/1982 | Jones ........................ | C11B 3/08 554/182 |
| 5,243,059 A | * | 9/1993 | Ibuki ........................ | C11B 3/10 554/191 |
| 2013/0302881 A1 | * | 11/2013 | Bhaggan .................... | C11B 3/10 554/204 |
| 2013/0323394 A1 | * | 12/2013 | Bruse ....................... | C11B 3/12 426/590 |
| 2016/0227809 A1 | * | 8/2016 | Mellerup ................ | C11B 3/006 |

FOREIGN PATENT DOCUMENTS

| | | | |
|---|---|---|---|
| CN | 103261386 A | 8/2013 | |
| CN | 103369972 A | 10/2013 | |
| CN | 103442577 A | 12/2013 | |
| CN | 105793403 A | 7/2016 | |
| GB | 1580664 A * | 12/1980 | ............... C11B 3/00 |
| WO | 0049116 | 8/2000 | |
| WO | 2011090240 A1 | 7/2011 | |
| WO | WO 2012/107230 A1 * | 8/2012 | ............... C11B 3/10 |
| WO | WO 2012107230 * | 8/2012 | ............... C11B 3/10 |
| WO | 2012169718 W | 12/2012 | |
| WO | 2015057139 A1 | 4/2015 | |
| WO | 2015058115 A1 | 4/2015 | |
| WO | WO 2015/058139 A1 * | 4/2015 | ............... C11B 3/12 |
| WO | 2015073359 A1 | 5/2015 | |
| WO | WO 2015/073359 * | 5/2015 | ............... C11B 3/00 |
| WO | 2015174821 A1 | 11/2015 | |

(Continued)

OTHER PUBLICATIONS

Pudel, F., et al., 3-MCPD- and glycidyl esters can be mitigated in vegetable oils by use of short path distillation, Eur. J. Lipid Sci. Technol , vol. 118, issue 3, pp. 396-405 (Year: 2016).*

Rossi, M., et al., The effect of bleaching and physical refining on color and minor components of palm oil, JAOCS, vol. 78, No. 10, pp. 1051-1055 (Year: 2001).*

Pudel, F., et al., On the necessity of edible oil refining and possible sources of 3-MCPD and glycidyl esters, Eur. J. Lipid Sci. Technol., vol. 113, No. 3, pp. 368-373 (Year: 2011).*

Basiron, Palm Oil, Bailey's Oil and Fat Products, 6th Edition, vol. 2, chapter 8, pp. 333-429 (Year: 2005).*

(Continued)

*Primary Examiner* — Yate' K Cutliff

(57) ABSTRACT

The present invention relates to a process for preparing a refined vegetable oil. It relates to a process for reducing the content of free chloropropanols and chloropropanol fatty acid esters in a vegetable oil, and it is comprising the following steps in order: a) refining a vegetable oil, wherein the refining is comprising at least a deodorization step at a temperature below 230° C., and subjecting the refined vegetable oil to a short path evaporation, and collecting a vegetable oil having a content of free chloropropanols and chloropropanol fatty acid esters of not more than 500 ppb and a color expressed as its red component equal or below 3.0.

11 Claims, No Drawings

(56) References Cited

FOREIGN PATENT DOCUMENTS

WO     2016053971 A1    4/2016

OTHER PUBLICATIONS

De Greyt, W., et al., Deodorization, Bailey's Industrial Oil and Fat Products, 6th Edition, vol. 5, chapter 8, pp. 341-383 (Year: 2005).*
Chang, Li, et al., "Antioxidants Inhibit Formation of 3-Monochloropropane-1, 2-diol Esters in Model Reactions", Journal of Agriculture and Food Chemistry, Nov. 11, 2015, 9850-9854.
Fereidoon, Shahidi, et al., "Stabilization of Conola Oil by Natural Antioxidants In: Lipids in Food Flavors", American Chemical Society, Washington DC. XP055418884, vol. 558, Jun. 7, 1997, 301-314.
Isbell, T.A., et al., "Oxidative stability index of vegetable oils in binary mixtures with meadowfoam oil", Industrial Crops and Products an International Journal, XP055483057, Jan. 1, 1999, 115-123.
Manel, Ben-Ali, "Stabilization of Sunflower Oil During Accelerated Storage: Use of Basil Extact as a Potential Alternative to Synthetic Antioxidants", International Journal of Food Properties, vol. 17, No. 7, Mar. 21, 2014, 1547-1559.
Matthaus, Bertrand, et al., "Mitigation of 3-MCPD and glycidyl esters within the production chain of vegetable oils especially palm oil", Lipid Technology, vol. 25, No. 7, XP055110706, Jul. 10, 2013, 151-155.
Pudel, Frank, "Mitigation of 3-MCPD and G Esters in refined palm oils", 103rd AOCS Annua. Meeting & Expo Apr. 29-May 2, 2012, 2012.
Zulkurnain, Musfirah, et al., "Optimization of Palm Oil Physical Refining Process for Reduction of 3-Monochloropropane-1, 2-diol (3-MCPD) Ester Formation", Journal of Agricultural and Food Chemistry, vol. 61, No. 13, Apr. 3, 2013, 3341-3349.
Cheng, W. et al., Glycidyl Fatty Acid Esters in Refined Oils: A Review on Formation, Occurrence, Analysis, and Elimination Methods. Comprehensive Reviews in Food Science and Food Safety, Jan. 30, 2017, vol. 16, No. 2, pp. 263-281.
The Lipid Handbook, Second Edition, Frank D. Gunstone, 1994, 258-275.

* cited by examiner

OILS WITHOUT UNWANTED CONTAMINANTS

CROSS REFERENCE TO RELATED APPLICATIONS

This application is a national phase application of PCT/US18/034072, filed 23 May 2018, entitled OIL S WITHOUT UNWANTED CONTAMINANTS, which claims the benefit of priority to European Application No. 17172752.2, filed 24 May 2017, entitled OILS WITHOUT UNWANTED CONTAMINANTS, which are hereby incorporated by reference in their entirety.

FIELD OF THE INVENTION

Use of short path evaporation to reduce unwanted contaminants, such as 3-MCPD fatty esters.

BACKGROUND OF THE INVENTION

Crude oils, as extracted from their original source, are not suitable for human consumption due to the presence of high levels of contaminants—such as free fatty acids, phosphatides, soaps and pigments—which may be either toxic or may cause an undesirable color, odor or taste. Crude oils are therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

Unfortunately, it has now been found that the refining process itself contributes to the introduction, of high levels of unwanted propanol components into the refined oil.

A lot of efforts have been taken to reduce the levels of these unwanted propanol components such as free chloropropanols, chloropropanol fatty acid esters, free epoxypropanols, epoxypropanol fatty acid esters, and combinations thereof. A lot of diverse processes have been developed in order to avoid, to mitigate or to reduce the content of these unwanted propanol components. These diverse processes each have been concerned with amending the process conditions of at least one or more of the standard refining steps.

WO2012/107230 describes a method for preparing a refined oil composition with a very low 3-MCPD ester and/or glycidyl ester content.

WO 2015/057139 describes a process for mitigating 2-MCPD, 3-MCPD, esters thereof and glycidyl esters in vegetable oils.

WO 2015/073359 describes the use of short path evaporation for reducing the content of chloropropanol fatty acid esters, epoxypropanol fatty acid esters and combinations thereof.

Yet, there is still a need for a process allowing to obtain a vegetable oil with low or negligible amounts of these unwanted propanol components, while maintaining high quality in all other aspects of the oil.

The current invention provides such a process and such an oil.

SUMMARY OF THE INVENTION

The current invention relates to a process for reducing the content of free chloropropanols and chloropropanol fatty acid esters in a vegetable oil, and the process is comprising the following steps in order:

a) Refining a vegetable oil, wherein the refining is comprising at least a deodorization step at a temperature below 230° C., preferably between 180° C. and 230° C., more preferably between 200° C. and 230° C., between 210° C. and 230° C., from 220° C. to 225° C., and b) Subjecting the refined vegetable oil to a short path evaporation, and c) Collecting a vegetable oil having a content of free chloropropanols and chloropropanol fatty acid esters of not more than 500 ppb and having a color expressed as its red component equal or below 3.0.

It further relates to the oil composition obtainable by the process of the present invention and the food product comprising food ingredients and the composition of the present invention.

DETAILED DESCRIPTION

The current invention relates to a process for reducing the content of free chloropropanols and chloropropanol fatty acid esters in a vegetable oil, and the process is comprising the following steps in order:

a) Refining a vegetable oil, wherein the refining is comprising at least a deodorization step at a temperature below 230° C., preferably between 180° C. and 230° C., more preferably between 200° C. and 230° C., between 210° C. and 230° C., from 220° C. to 225° C., and b) Subjecting the refined vegetable oil to a short path evaporation, and c) Collecting a vegetable oil having a content of free chloropropanols and chloropropanol fatty acid esters of not more than 500 ppb and having a color expressed as its red component equal or below 3.0.

It further relates to the process of the invention wherein the short path evaporation is optionally followed by a bleaching step and/or a deodorizing step.

The vegetable oil may be derived from any vegetable oils or vegetable oil blends. Examples of suitable vegetable oils include: soybean oil, corn oil, cottonseed oil, palm oil, palm kernel oil, peanut oil, rapeseed oil, safflower oil, sunflower oil, sesame seed oil, rice bran oil, coconut oil, canola oil and any fractions or derivatives thereof. According to a particularly preferred aspect of the invention, the vegetable oil will be derived from palm oil.

Palm oil is encompassing palm oil, palm oil fractions such as stearin and olein fractions (single as well as double fractionated, and palm mid fractions) and blends of palm oil and/or its fractions.

The current invention relates to a process that is suitable to reduce the content of free chloropropanols and chloropropanol fatty acid esters to not more than 500 ppb. Furthermore, the selection of the reaction conditions of step a) and b) of the process of the current invention allows obtaining a vegetable oil having a color expressed as its red component equal or below 3.0.

Deodorising

The deodorising process and its many variations and manipulations are well known in the art. Preferably, it will include introducing the oil into a deodoriser and contacting it with steam to vaporize and drive off free fatty acids (FFAs) and other volatile impurities, resulting in a deodorised oil and a vapour stream.

The deodoriser may be any of a wide variety of commercially available deodorizing systems, including both multichamber deodorisers (such as those sold by Krupp of Hamburg, Germany; De Smet Group, S A. of Brussels, Belgium; Gianazza Technology s.r.l. of Legnano, Italy; Alfa Laval AB of Lund, Sweden, or others) and multi-tray deodorisers (such as those sold by Krupp, DeSmet Group, S.A., and Crown Ironworks of the United States).

The deodoriser is desirably maintained at an elevated temperature and a reduced pressure to better volatilise the FFAs and other volatile impurities. Most often, the deodoriser will be maintained at a pressure of no greater than 10 mm Hg. Preferably, it will be maintained at a pressure of no greater than 5 mm Hg, e.g., 1-4 mm Hg.

The temperature in the deodoriser is below 230° C., preferably between 180° C. and 230° C., more preferably between 200° C. and 230° C., between 210° C. and 230° C., from 220° C. to 225° C.

Preferably, the vegetable oil is derived from palm oil.

It is surprisingly to be able obtaining a vegetable oil having a content of free chloropropanols and chloropropanol fatty acid esters of not more than 500 ppb and having a color expressed as its red component equal or below 3.0, while in the current process the temperature of deodorization is below 230° C. In fact, carotenoid elimination typically occurs during deodorization at high temperatures and is therefore sometimes called a heat bleaching step. Heat degradation of carotene is very slow at 210° C., but takes only a few minutes at temperatures higher than 260° C. This is one reason why palm oil is typically deodorized at temperatures above 230° C., preferably at about 260° C.

This is clearly demonstrated in the reference examples.

A quantity of steam is delivered to the deodoriser, e.g. through low-pressure steam lines (at 1-5 Bar for example), and is then sprayed into the oil. As the steam, which may be superheated, bubbles through the oil, it will help strip it of its FFAs and other volatile impurities. The flow rate of steam through the oil will vary depending on the nature and quality of the oil being deodorised and the pressure and temperatures in the deodoriser. Generally, though, steam flow rates in the order of 0.7-2.5 weight percent (wt. %) of the oil flow rates should suffice for most common processing conditions. This produces a steam-containing vapour stream which is delivered from the deodoriser to one or more condensers.

Short Path Evaporation (SPE)

Short path evaporation (SPE) or short path distillation is a distillation technique or thermal separation technique operating at process pressures below 1 mbar, preferably below 0.05 mbar, more preferably below 0.01 mbar, most preferably below 0.001 mbar. It involves that the distillate is travelling a short distance, often only a few centimetres, at reduced pressure. It is an excellent method for gentle thermal treatment. This technique is often used for compounds which are unstable at high temperatures or to purify small amounts of compound. The advantage is that the heating temperature can be considerably lower (at reduced pressure) than the boiling point of the liquid at standard pressure, and the distillate only has to travel a short distance before condensing. A short path ensures that almost no compound is lost on the sides of the apparatus.

The short path evaporation is performed to reduce, remove, and mitigate the content of unwanted propanol components such as free chloropropanols, chloropropanol fatty acid esters, free epoxypropanols, epoxypropanol fatty acid esters, and combinations thereof, preferably free chloropropanols, and chloropropanol fatty acid esters. A typical example of free chloropropanols, chloropropanol fatty acid esters is 3-MCPD and 3-MCPD fatty esters. The current process is preferably aiming to reduce the content of free chloropropanols, and chloropropanol fatty acid esters.

The short-path evaporation is performed at a temperature of from 90 to 350° C., from 100 to 300° C., preferably from 140° C. to 280° C., 220° C. to 260° C., more preferably from 240-280° C.

To reduce the content of propanol components selected from free epoxypropanols and epoxypropanol fatty acid esters the short path evaporation is preferably performed at a temperature of from 140 to 210° C., more preferably from 150 to 200° C.

Preferably a temperature of from 200 to 350° C., from 220° C. to 300° C., 220° C. to 260° C., more preferably from 240-208° C., is used to reduce the content of propanol components selected from free chloropropanols and chloropropanol fatty acid esters, such as 3-MCPD and 3-MCPD fatty esters.

Furthermore, the short path evaporation is performed at a pressure below 1 mbar, preferably below 0.05 mbar, more preferably below 0.01 mbar, most preferably below 0.001 mbar.

Unless specified otherwise, the content of the unwanted propanol components as mentioned above either alone or in combination will be determined using Method DGF Standard Methods Section C (Fats) C-VI 18(10).

The process of the current invention allows to reduce the total content of the unwanted propanol components, preferably the content of free chloropropanols and chloropropanol fatty acid esters (preferably 3-MCPD and/or 3-MCPD fatty esters) by at least 50%, 60%, 70%, preferably it is reduced by at least 75%, 85%, 95% and even up to 99%. In a typical example wherein the vegetable oil is a refined, bleached and deodorized (RBD) oil containing more than 1 ppm 3-MCPD and/or MCPD fatty esters, this content is reduced with at least 75% by applying the process of the present invention.

Furthermore, the process of the current invention allows to obtain an oil with good quality in all other aspects. It has been found that by applying the process of the present invention, the colour, expressed as its red component is equal or below 3.0. Colour was measured according to the Lovibond method (official AOCS method Cc13e-92). A 5¼ inch glass measuring cell was used.

According to another aspect of the invention, the process of the current invention relates to a process wherein the refining is further including at least one or more of the following steps: degumming step, neutralization step, bleaching step.

Each of these steps is here outlined below.

Degumming

Any of a variety of degumming processes known in the art may be used. One such process (known as "water degumming") includes mixing water optionally containing acid such as citric acid and/or phosphoric acid, with the crude oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming, enzymatic degumming (e.g., ENZYMAX from Lurgi) or chemical degumming (e.g., SUPERIUNI degumming from Unilever or TOP degumming from VandeMoortele/Dijkstra CS).

Alkali or Caustic Refining

If so desired, crude or degummed oil may be refined via alkali refining. In alkali refining, the oil is commonly mixed with a hot, aqueous alkali solution, producing a mixture of partially refined or "neutral" oil and soapstock. The soapstock is then separated off and the partially refined oil is delivered to the next refining step.

Bleaching

The crude or partially refined oil may then be delivered to a bleaching system. The nature and operation of the bleaching system will depend, at least in part, on the nature and quality of the oil being bleached. Generally, the raw or partially refined oil will be mixed with a bleaching agent which combines with oxidation products, trace phosphatides, trace soaps, and other compounds adversely affecting the colour and flavour of the oil. While in general bleaching may have an effect on the colour, it is known in the art that chlorophyll (green) must be reduced during the bleaching process, and carotenoids (orange) are usually reduced in later steps (such as deodorization step) of the oil refining process. The current process has clearly shown that in particular the temperature of the subsequent deodorization step is determining that the colour expressed as its red component is equal or below 3.0. The reference examples have clearly demonstrated that a well-known bleaching step is not sufficient to secure that the colour, expressed as its red component, is equal or below 3.0. As is known in the art, the nature of the bleaching agent can be selected to match the nature of the crude or partially refined oil to yield a desirable bleached oil. Bleaching agents generally include neutral, non-activated bleaching agent, or "activated" bleaching clays, also referred to as "bleaching earths", activated carbon and various silicates and zeolites. A skilled person will be able to select a suitable bleaching agent from those that are commercially available. Typically, the bleaching temperature ranges from 90 to 110° C.

In a regular bleaching step, the bleaching agent is added in an amount of 0.8 to 1.5% based upon weight of vegetable oil.

In another aspect of the invention, it relates to a process wherein the bleaching agent is used in an amount which is significantly higher than the amount used in a regular bleaching step. Such an amount can go up to 10%, in the range of 2% to 8%, or from 3% to 5% based upon weight of vegetable oil.

In another aspect of the invention it relates to a process wherein the bleaching steps is performed at low temperature, i.e. at a temperature below 100° C., preferably from 60 to 80° C., more preferably from 70-75° C.

According to yet another aspect of the invention the current invention relates to a process comprising the sequence of the following steps:
a) Degumming step,
b) Optionally neutralisation step,
c) Bleaching step,
d) Deodorizing step at a deodorization temperature below 230° C., preferably between 180° C. and 230° C., more preferably between 200° C. and 230° C., between 210° C. and 230° C., from 220° C. to 225° C.,
e) Short path evaporating step,
f) Optionally bleaching step,
g) Optionally deodorizing step,
h) Collecting a vegetable oil having a content of free chloropropanols and chloropropanol fatty acid esters of not more than 500 ppb and having a color expressed as its red component equal or below 3.0.

Furthermore each of the bleaching steps or at least one of the bleaching steps can be performed at low temperature, i.e. at a temperature below 100° C., preferably from 60 to 80° C., more preferably from 70-75° C. Alternatively, the bleaching steps or at least one of the bleaching steps can be performed in presence of an amount bleaching agent which is significantly higher than the amount used in a regular bleaching step.

The current invention further relates the oil composition obtainable by the process according to present invention. Preferably, said oil composition has a content of free chloropropanols and chloropropanol fatty acid esters (preferably 3-MCPD and/or 3-MCPD fatty esters) of not more than 500 ppb and it has a color expressed as its red component equal or below 3.0. The current invention relates to a vegetable oil prepared according to the process comprising refining a vegetable oil, wherein the refining is comprising at least a deodorization step at a temperature below 230° C., preferably between 180° C. and 230° C., more preferably between 200° C. and 230° C., between 210° C. and 230° C., from 220° C. to 225° C., and subjecting the refined vegetable oil to a short path evaporation, and wherein the vegetable oil is having a content of free chloropropanols and chloropropanol fatty acid esters of not more than 500 ppb and having a color expressed as its red component equal or below 3.0.

Furthermore, the current invention relates to a food product comprising food ingredients and the oil composition of the present invention. The current invention relates to a food product comprising food ingredients and the vegetable oil prepared according to the process of the present invention. More in particular, the food product of the current invention is infant food, food for elderly people, confectionary, frying oil, table oil or salad dressing.

Infant food is a term well-known in the art and it refers to food that is specifically manufactured for infants and it may be characterized in that is soft, and easily consumable by infants and has a nutritional composition adapted to the specific needs at each growth stage.

Food for elderly people is a term well-known in the art and it is taking into account the nutritional needs of elderly people. Food for elderly people is a calorically dense formulation that provides increased energy and nutrition with minimum amount of fluid.

Finally, the current invention relates to the use of short path evaporation and deodorization at deodorization temperature below 230° C. to improve the colour of vegetable oil. More in particular, it relates to the use wherein the color expressed as its red component is equal or below 3.0.

Furthermore it relates to the use of the process of the present invention to reduce the content of free chloropropanols and chloropropanol fatty acid esters (preferably 3-MCPD and/or 3-MCPD fatty esters) in a vegetable oil and for improving the color of the vegetable oil. In fact, the 3MCPD level was reduced with at least 50%, 60% or 70%, preferably it is reduced by at least 75%, 85%, 95% and even up to 99% in comparison to the reference.

In fact, the current invention clearly has demonstrated that the claimed process allows obtaining an oil composition with reduced content of unwanted propanol components, in particular reduced content of free chloropropanols and chloropropanol fatty acid esters (preferably 3-MCPD and/or 3-MCPD fatty esters) and moreover the color of the oil, expressed as its red component is equal or below 3.0. In particular, applicable for vegetable oil derived from palm oil. The reference examples have demonstrated that combining short path evaporation with deodorization at temperatures above 230° C. still increase the colour. Surprisingly it was found that running a process comprising deodorization at temperature below 230° C. and short part evaporation results in improvement of the colour.

The invention will hereunder be illustrated in following examples.

EXAMPLES

Reference Examples (1A-1B)

Example 1A

Crude palm oil was degummed (classic wet-acid degumming process) and subsequently bleached using 1% bleaching agent (Taiko Classic 1G) and deodorized for 2 hours at 260° C. 3-MCPD levels of this refined palm oil was over 1000 ppb as indicated in Table 1.

Example 1B

Crude palm oil was degummed (classic wet-acid degumming process), subsequently neutralized using caustic soda in an amount in excess based on the FFA content of the crude oil. Afterwards the neutralized oil was bleached at 95° C. using bleaching agent (Taiko Classic 1G) and deodorized for 2 hours at 225° C. 3-MCPD levels of this refined palm oil was over 1000 ppb as indicated in Table 1.

Example 1C

The refined palm oil obtained in Example 1A was subsequently subjected to SPE treatment according to the following conditions:
A Short Path Evaporation unit KDL-5 from UIC was used. The following conditions were applied:
Feed temperature: 70° C.
Condenser temperature: 80° C.
Distillate temperature: 160° C.
Wiper speed: 366 rpm
Pressure: 4-6 $10^{-4}$ mbar
Evaporator temperature: as indicated in table 1
Flow setting: as provided in Table 1
3MCPD level as well as color (red) were measured (see results for sample 1B in Table 1).

Examples 2-4—According to the Process of the Invention

The specific conditions of each of the refining step are provided in Table 1.
Crude palm oil was degummed using a classic wet-acid degumming process. The oil was subsequently neutralized using caustic soda in an amount in excess based on the FFA content of the crude oil.
Afterwards the neutralized oil was bleached at 95° C. using bleaching agent (Taiko Classic 1G). The amount of the added bleaching agent is provided in Table 1.
The bleaching step was followed by a deodorization step. Deodorization conditions (time and temperature) are given in Table 1.
The resulting deodorized oil was subsequently subjected to an SPE treatment.
A Short Path Evaporation unit KDL-5 from UIC was used. The following conditions were applied:
Feed temperature: 70° C.
Condenser temperature: 80° C.
Distillate temperature: 160° C.
Wiper speed: 366 rpm
Pressure: 4-6 $10^{-4}$ mbar
Evaporator temperature: as indicated in table 1
Flow setting: as provided in Table 1
3MCPD level as well as color (red) were measured (see results in Table 1).

TABLE 1

| | 1A (reference) | 1B (reference) | 1C (reference) | 2 | 3 | 4 |
|---|---|---|---|---|---|---|
| Alkali neutralized | No | Yes | No | Yes | Yes | Yes |
| Dosage bleaching agent (%) | 1 | 1 | 1 | 1 | 1 | 2 |
| Deodorization temperature (° C.) | 260 | 225 | 260 | 225 | 225 | 225 |
| Deodorization time (hours) | 2 | 2 | 2 | 2 | 4 | 2 |
| SPE temperature (° C.) | | | 260 | 240 | 260 | 260 |
| SPE flow setting | | | | | | |
| (rpm) | | | 17 | 12.5 | 20 | 23 |
| (ml/h) | | | 306 | 225 | 360 | 414 |
| 3MCPD (ppb) | >1000 | >1000 | 264 | 243 | 143 | 73 |
| red | 2.5 | 2.7 | 3.2 | 2.8 | 2.9 | 2.9 |

For each example according to the process of the invention, the 3MCPD level was reduced with at least 75% in comparison to the reference.

For each example according to the invention, the color expressed as its red component is equal or below 3.0

The invention claimed is:

1. A process for reducing the content of free chloropropanols and chloropropanol fatty acid esters in a vegetable oil, and the process is comprising the following steps in order:
   a) degumming step,
   b) neutralization step,
   c) first bleaching step,
   d) first deodorizing step at a deodorization temperature below 230° C.,
   e) short path evaporating step,
   f) second bleaching step,
   g) second deodorizing step
   h) collecting a vegetable oil having a content of free chloropropanols and chloropropanol fatty acid esters of not more than 500 ppb and having a color expressed as its red component equal or below 3.0;
   wherein the vegetable oil is derived from palm oil.

2. The process according to claim 1 wherein the first or second bleaching step is using bleaching agent in an amount ranging from 2% to 10% based on the weight of the vegetable oil.

3. The process according to claim 1 wherein the first or second bleaching step is using bleaching agent selected from neutral, non-activated bleaching agent, activated bleaching clay, silicates, zeolites.

4. The process according to claim 1 wherein the degumming is using a degumming agent selected from water, citric acid, phosphoric acid or mixtures thereof.

5. The process according to claim 1, wherein the short path evaporation is performed at a temperature between at least 260° C. to 350° C.

6. The process according to claim 1 wherein the short path evaporation is performed at a pressure of below 0.001 to 3 mbar.

7. The process according to claim 1, wherein the deodorization step of step d) is at a temperature between 180° C. and 230° C.

8. The process according to claim 1, wherein the short path evaporation is performed at a temperature from 140° C. to 280° C.

9. The process according to claim 1, wherein the short path evaporation is performed at a temperature of from 140° C. to 210° C.

10. The process according to claim 1, wherein the short path evaporation is performed at a temperature of from 200° C. to 350° C.

11. The process according to claim 1, wherein the process reduces the content of free chloropropanols and chloropropanol fatty acid esters in a vegetable oil by at least 50% and up to 99%.

\* \* \* \* \*